(No Model.)
E. FAIR.
RUNNING GEAR FOR VEHICLES.
No. 349,988. Patented Sept. 28, 1886.
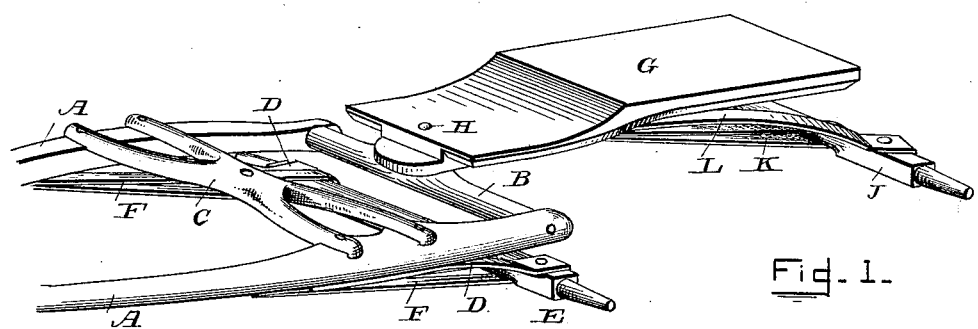
Fig. 1.
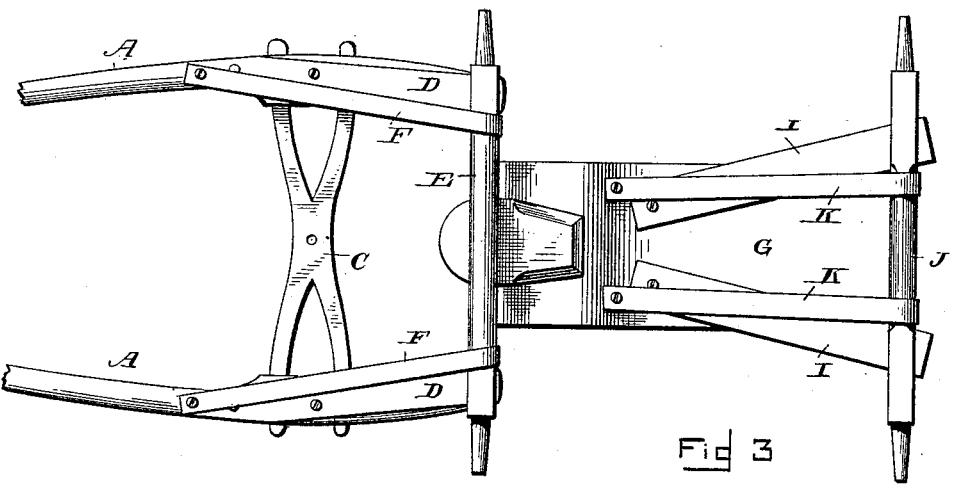
Fig. 2.
Fig. 3
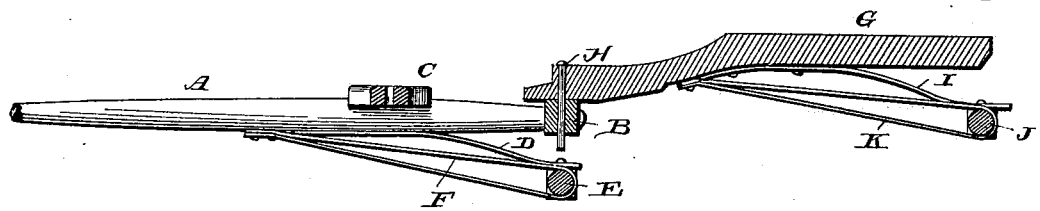
WITNESSES
C. H. Ourand
Edward Stanton
INVENTOR,
Eli Fair,
By Louis Bagger & Co
Attorneys

UNITED STATES PATENT OFFICE.

ELI FAIR, OF AROMA, INDIANA.

RUNNING-GEAR FOR VEHICLES.

SPECIFICATION forming part of Letters Patent No. 349,988, dated September 28, 1886.

Application filed February 15, 1886. Serial No. 191,991. (No model.)

*To all whom it may concern:*

Be it known that I, ELI FAIR, a citizen of the United States, and a resident of Aroma, in the county of Hamilton and State of Indiana, have invented certain new and useful Improvements in Running-Gear for Vehicles; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of as much of a vehicle as is sufficient to illustrate my improvement. Fig. 2 is a bottom view of the same, and Fig. 3 is a longitudinal vertical sectional view of the same.

Similar letters of reference indicate corresponding parts in all the figures.

My invention has relation to running-gear for vehicles; and it consists in the improved construction and combination of parts of the running-gear of a vehicle in which the shafts are connected to the front axle by means of springs, and in which the forward end of the body has a king-bolt pivoted in the middle of a transverse pivoted bar at the rear ends of the shafts, as hereinafter more fully described and claimed.

In the accompanying drawings, the letters A A indicate the shafts, which are connected at their rear ends by means of the pivoted cross-bar B, having its ends pivoted in the rear ends of the shafts, and the shafts are, furthermore, connected near the rear ends by the rigid cross-piece C, or cross-bar, to which cross-bar the single-tree is pivoted, and which cross-bar serves to brace and hold the shafts together, having its ends bifurcated and secured at a distance from each other to the shafts. Flat and downwardly-inclined springs D D are secured at their forward ends to the under sides of the shafts slightly forward of the rigid cross-bar, and the rear ends of these springs are secured to near the ends of the front axle, E, which is immediately under the pivoted cross-bar, and the doubled ends of two straps, F F, are passed around the axle and are secured to the shafts at the same points at which the springs are secured.

G is the bottom of the vehicle-body, and the king-bolt H is secured in the forward end of this bottom, projecting downward, and the forward ends of two rearwardly-inclined springs, I I, are secured to the middle of the bottom and have their rear ends secured to the rear axle, J, around which the doubled ends of two straps, K K, are passed, which straps are secured at their forward ends to the bottom of the vehicle-body near the ends of the springs. It will be seen that the springs will serve as couplings for the shafts, as well as in the capacity of forward springs, and the pivoted cross-piece will allow sufficient up and-down play for the shafts, preventing the said play of the shafts from interfering with the body of the vehicle, while the wheels, being attached to the shafts by the springs, will prevent the shafts from rocking too freely in the shaft loops of the harness, the springs breaking the free and loose up-and-down play of the shafts. At the same time the springs will also prevent any rough or abrupt motion of the front wheels from communicating to the shafts, the springs allowing the shafts sufficient play and preventing any undue amount of play. The doubled straps passing around the axles prevent any accident in the case of a spring breaking, as the strap will catch the axle if a springs breaks and prevent the shafts or the body from running off from the axle. The pivoted cross-bar will dispense with the necessity of any fifth-wheel, as the king-bolt may simply be pivoted in a perforation in the center of the cross-bar, when the forward portion of the running-gear will be perfectly swiveled under the vehicle-body.

Having thus described my invention, I claim and desire to secure by Letters Patent of the United States—

1. The combination of the body of a vehicle having the rear axle supported under it, a cross-bar pivoted at its middle to swing in a horizontal plane under the forward end of the body, and shafts pivoted at their rear ends to the ends of the cross-bar, and having the front axle supported by springs under their rear ends, as and for the purpose shown and set forth.

2. The combination of a pair of shafts having a rigid cross-bar connecting them near the rear ends, and having rearwardly-inclined springs secured to their under sides near the rear ends, a cross-bar pivoted at its ends in the rear ends of the shafts, and having a central vertical perforation, a front axle secured to the rear ends of the springs directly under the pivoted cross-bar, and a vehicle-body having its rear end supported by springs from a rear axle, and having a downwardly-projecting king-bolt at its forward end pivoted in the central bearing in the pivoted cross-bar, as and for the purpose shown and set forth.

3. The combination of the rearwardly-inclined springs, the axles secured to their rear ends, and the straps secured at their forward ends near the forward ends of the springs, and having their doubled ends passed around the axles, as and for the purpose shown and set forth.

4. The combination of the shafts having a rigid cross-bar secured with its spreading bifurcated ends to the shafts near the rear ends of the same, flat springs secured at their forward ends to the under sides of the shafts, and having their rear ends downwardly inclined, a front axle secured to the rear ends of the springs under the rear ends of the shafts, doubled straps passed around the axle and secured to the shafts, a cross-bar pivoted at its ends in the rear ends of the shafts, and having a vertical central perforation or bearing, a vehicle-body having a downwardly-projecting king-bolt at its forward end turning and fitting in the central bearing of the pivoted cross-bar, flat springs secured at their forward ends to the bottom of the vehicle-body near its forward end, a rear axle secured to the rear inclined ends of the springs, and doubled straps passing around the axle and secured to the bottom of the vehicle-body near the forward ends of the springs, as and for the purpose shown and set forth.

In testimony that I claim the foregoing as my own I have hereunto affixed my signature in presence of two witnesses.

ELI FAIR.

Witnesses:
CASSIUS M. GREENELL,
JEFFERSON C. CLYMER.